United States Patent [19]

Moore et al.

[11] 3,939,255

[45] Feb. 17, 1976

[54] PROCESS FOR PRODUCTION OF AMMONIUM POLYPHOSPHATES

[75] Inventors: William Percy Moore, Hopewell, Va.; John Harvey Agee, Baton Rouge, La.

[73] Assignee: Allied Chemical Corporation, New York, N.Y.

[22] Filed: June 11, 1973

[21] Appl. No.: 368,554

Related U.S. Application Data

[63] Continuation-in-part of Ser. No. 167,810, July 30, 1971, abandoned.

[52] U.S. Cl. .................... 423/313; 423/310; 71/43
[51] Int. Cl.$^2$ ................. C01B 15/16; C01B 25/26
[58] Field of Search .......................... 423/305–313; 71/43

[56] References Cited
UNITED STATES PATENTS

| | | | |
|---|---|---|---|
| 3,044,851 | 7/1962 | Young | 23/107 |
| 3,464,808 | 9/1969 | Kearns | 71/34 |
| 3,492,087 | 1/1970 | MacGregor et al | 423/305 |
| 3,677,734 | 7/1972 | Carroll et al | 71/34 |
| 3,734,708 | 5/1973 | Burns | 71/34 |

Primary Examiner—Oscar R. Vertz
Assistant Examiner—Gregory A. Heller
Attorney, Agent, or Firm—Fred L. Kelly

[57] ABSTRACT

Ammonium polyphosphates having a major portion of the $P_2O_5$ content thereof in the form of condensed phosphates are prepared by reacting wet-process phosphoric acid directly with ammonia under specified conditions. It is demonstrated that exchange and recovery of heat from the hot ammonium polyphosphate reaction mixture is critical to allow production of ammonium polyphosphate solutions from orthophosphoric acid and ammonia with polyphosphate contents high enough for chelating inherent impurities during extended periods of storage. Moreover, the present invention avoids substantial corrosion of the equipment.

1 Claim, No Drawings

PROCESS FOR PRODUCTION OF AMMONIUM POLYPHOSPHATES

RELATED APPLICATIONS

This application is a continuation-in-part of our U.S. application Ser. No. 167,810 filed July 30, 1971, now abandoned which is incorporated herein by reference.

BACKGROUND OF THE INVENTION

This invention relates to the production of ammonium polyphosphate solutions. More particularly, it relates to the production of stable ammonium polyphosphate fertilizer solutions by the direct ammoniation of concentrated phosphoric acid derived from wet-process acid. Wet-process phosphoric acid is produced by decomposing phosphate rock, particularly calcium phosphate, with sulfuric acid and separating the phosphoric acid from the precipitated calcium sulfate. The resulting crude phosphoric acid contains various amounts of impurities such as iron, aluminum, calcium, magnesium and other metals in the form of their phosphates, sulfates or fluorides, depending on the characteristics of the particular phosphate rock which is used as a starting material. Because of the simplicity and cheapness of its manufacture, wet-process phosphoric acid is regarded as an excellent source of fertilizer grade phosphates. However, because of the presence of the aforementioned impurities its use is fraught with many difficulties and complications. As is well known, when wet-process phosphoric acid is treated with ammonia to form aqueous ammonium phosphate solutions, the impurities present in the acid form gelatinous precipitates which are extremely difficult to separate from the aqueous phase by filtration or other conventional methods. These precipitates form large deposits in the equipment used for storage and transfer and make handling difficult. The prior art discloses several attempts to overcome this difficulty. The use of sequestering agents, such as sodium hexametaphosphate, has proved unsatisfactory. Other methods involve heat treatment under controlled conditions to form various compounds which retain the metal impurities in solution, but such methods have the disadvantage of tieing up susbstantial amounts of polyphosphate. For example, it has been found that when more than about 2% of $Al_2O_3$ and $Fe_2O_3$ are present, the availability of the phosphate is substantially reduced due to the formation of iron and aluminum pyrophosphates. Still another prior art method for overcoming the aforementioned problem comprises neutralizing the crude phosphoric acid at elevated pressure and temperature to cause the metal compounds to precipitate in a form which is readily filtered from the resulting polyphosphate solution. This process has the disadvantage of requiring pressure resistant equipment which adds to the cost.

U.S. Pat. No. 3,464,808 to Kearns relates to manufacture of ammonium polyphosphates from wet process phosphoric acid. Phosphoric acid having $P_2O_5$ content of between about 55 and 65% is reacted with ammonia under conditions that simultaneously neutralize and molecularly dehydrate the acid whereby at least 20% of the orthophosphate is converted to non-orthophosphate (polyphosphate) and the resulting ammonium polyphosphate possesses self-sequestering properties. The patent features supplying a stream of ammonia to a jet reactor, supplying a stream of concentrated phosphoric acid to said jet reactor, and contacting said ammonia and said acid in said reactor at temperatures of 450°F. to 650°F. for a period of less than one second to form molten droplets of ammonium polyphosphate. The molten product is subsequently quenched, e.g., by dissolving it in an aqueous system and further neutralizing the reaction product. Unfortunately, this process does not produce a product high in polyphosphate unless the wet-process phosphoric acid is preheated, and then the reaction mixture becomes so hot that it is highly corrosive. Generally, the reaction vessel is completely corroded within a few weeks.

U.S. Pat. No. 3,677,734 to Carroll et al. discloses that ammonium polyphosphates having a major portion of the $P_2O_5$ content thereof in the form of condensed phosphates, are prepared by ammoniating wet-process phosphoric acid with ammonia in a multi-stage operation under specified conditions. The patent features contacting the wet-process phosphoric acid having a $P_2O_5$ content of 50 to 65% by weight with impinging ammonia gas at a gas stream velocity of 1,000 to 2,500 feet per second, at an $NH_3:H_3PO_4$ mol ratio of 0.4 to 0.8, a temperature of 375° to 425°F., a pressure of 15 to 75 psi and a time of 0.1 to 4 minutes to form ammonium phosphate product and steam; removing steam from the product; and contacting the ammonium phosphate with excess impinging ammonia at a velocity of 1,000 to 2,500 feet per second, a temperature of 450° to 500°F., a pressure of 30 to 200 psi, and a time of 5 seconds to less than 2 minutes to form ammonium polyphosphate wherein at least 50% of the $P_2O_5$ is in polyphosphate form. This process produces an improved product; however, it would be highly desirable to produce a similar product in a single-stage operation instead of a multistage operation.

U.S. Pat. No. 3,492,087 to Moore et al. discloses a process wherein relatively pure ammonium polyphosphate fertilizer solution is prepared by introducing preheated ammonia into wet process phosphoric acid and heating the mixture to at least 205°C. to produce an anhydrous molten mass which is then dissolved in an aqueous medium. Filterable solids are separated to produce a clear ammonium polyphosphate solution. The ammoniation is preferably conducted in two stages, wherein preheated anhydrous ammonia is introduced into the second stage and the unabsorbed ammonia therefrom is used to partially neutralize the acid in the first stage.

Although the disclosure of U.S. Pat. No. 3,492,087 is an important contribution to this art, research studies have been continued in an effort to develop an improved process which would obviate the remaining three main problems of direct ammoniation technology, i.e., formation of relatively large quantities of insoluble iron and aluminum ammonium phosphates, severe corrosion of the reactor, and insufficient heat from the direct ammoniation to produce a product high in polyphosphate content. Clearly, it would be highly desirable to define a direct ammoniation procedure that would substantially avoid the precipitation of solids and thereby eliminate the costly filtration step of the above-described patented process.

SUMMARY OF THE INVENTION

In view of the foregoing, it is an object of the present invention to provide an improved process for producing ammonium polyphosphate solutions from wetprocess phosphoric acid.

It is a further object of the present invention to provide an economical process for producing a liquid nitrogen-phosphate fertilizer from wet-process phosphoric acid, wherein the available amount of phosphoric anhydride is totally water soluble.

Another object of the invention is to provide an improved process for producing ammonium polyphosphate solutions high in polyphosphate content by direct ammoniation of wet-process phosphoric acid.

These and other objects and advantages which will be obvious hereinafter are achieved by the present invention which is set forth in the following description wherein parts and percentages are by weight.

The present invention is an improvement over our process of U.S. application Ser. No. 167,810 filed July 30, 1971. The present invention may be summarized as follows. In a process for production of ammonium polyphosphate solution which comprises the following steps:

a. providing a concentrated wet-process phosphoric acid containing at least 55% $P_2O_5$, preferably 60–70% $P_2O_5$;

b. continuously reacting said concentrated acid with substantially anhydrous ammonia at a temperature of 550°–650°F. for at least 1 second, preferably 5–60 seconds, sufficient ammonia being reacted with the acid to produce a reaction melt having a nitrogen to $P_2O_5$ weight ratio between about 0.12 and 0.18, whereby the polyphosphate content of the melt is increased to 60–90% of the total $P_2O_5$ without formation of insoluble reaction products; and c. continuously quenching the resulting reaction melt in aqueous ammonia of sufficient concentration to form a clear solution containing 10–13% nitrogen and 33–37% $P_2O_5$ having 60–90% of the total $P_2O_5$ in polyphosphate form, the improvement comprising:

1. preheating the concentrated wet-process phosphoric acid utilized in step (b) in a conventional steam-heated heat exchanger to a temperature of 200°–290°F., preferably 240°–275°F.;

2. further preheating said concentrated wet-process phosphoric acid to a temperature of about 320°–500°F., preferably 400°–500°F. by indirectly contacting the acid with the hot reaction melt in step (b) conventional heat exchanger;

3. preheating the substantially anhydrous ammonia utilized in step (b) in a conventional steam-heated heat exchanger to a temperature 200°–440°F., preferably 275°–440°F., and 4. further preheating said ammonia to a temperature of 320°–540°F. preferably 450°–540°F., by indirectly contacting the ammonia with the hot reaction melt in step (b) in a conventional heat exchanger.

The concentrated wet-process phosphoric acid utilized in the process of the present invention can be obtained by evaporating commercial wet-process phosphoric acid. Such acid usually contains about 0.8 to 1.8% iron, 0.6 to 1.3% aluminum, 0.2 to 0.5% magnesium, 0.04 to 0.4% calcium, 0.04 to 0.1% potassium and 0.03 to 0.1% sodium, analyzed in the form of the respective oxides. However, some of the metal cations may be removed prior to use by any suitable means such as ion exchange. Alternatively, if desired, the acid utilized in the process can consist of a simple mixture of commercial wet-process phosphoric acid and superphosphoric acid, which is the term usually applied to phosphoric acid that contains around 70 to 76% $P_2O_5$ comprising ortho- and polyphosphoric acids. From an economic viewpoint, it is generally preferable to utilize a concentrated wet-process phosphoric acid containing little or no added superphosphoric acid.

The ammonia feed for the process is desirably anhydrous ammonia; however, a small proportion of water can be tolerated in the ammonia if the wet-process phosphoric acid utilized in the process is highly concentrated.

The pressure under which the reaction mixture is heated should be sufficiently low to allow vaporization of water present in the acid as well as that which is split off during the formation of the polyphosphate. Pressures of 0.5 to 5 atmospheres are advantageously used, thus permitting the use of less costly equipment.

A reaction temperature of 550° to 650°F. is utilized for the polyphosphate formation. A reaction time of at least 1 second, preferably 5 to 60 seconds, is required for adequate reaction. Surprisingly, at the specified nitrogen to $P_2O_5$ ratios, no solids are formed. This is particularly unexpected in view of U.S. Pat. No. 2,415,797 which teaches that the metallic impurities of iron and aluminum preciptiate out of wet-process phosphoric acid when it is heated to temperatures of 300°C. (572°F). It may be theorized that the polyphosphates rapidly produced in the instant process form chelates with the iron and aluminum which are stable throughout the process.

The heating is continued until a substantially anhydrous melt is obtained wherein at least 60%, preferably 65 to 80% of the $P_2O_5$ is present as polyphosphate. Prolonged heating should be avoided to avoid possible formation of metaphosphates. Generally, the reaction is complete within 60 seconds. A reactor designed for plug flow is utilized.

As indicated hereinabove, sufficient ammonia is reacted with the phosphoric acid in the high temperature reactor to produce an ammoniated polyphosphate melt having a nitrogen to $P_2O_5$ weight ratio being about 0.12 to 0.18. Preferably, the melt contains about 9–10% nitrogen and about 60—63% $P_2O_5$.

The ammonium polyphosphate melt may be cooled and stored, but desirably is quenched directly in aqueous ammonia. The preferred solvent is aqueous ammonia of sufficient concentration to produce a solution containing about 10 to 13% nitrogen and 33 to 37% $P_2O_5$. Temperature during dissolution is preferably maintained at about 75° to 212°F. Surprisingly, the product ammonium polyphosphate solution is substantially free of precipitates.

The liquid ammonium polyphosphate product of this process has particular value in the fertilization of crops because of its ability to supply easily dispensed primary nutrients as well as trace amounts of micronutrients, particularly iron in chelated form. Such solutions will remain stable, i.e., substantially free from precipitated solids for at least 90 days at normal temperatures. Preferred solutions have a nitrogen content of about 10 to 13%, a $P_2O_5$ content of about 33 to 37% and a pH in the range 5.5 to 6.5.

To obtain optimum conversion of the $P_2O_5$ to polyphosphate, it is critical to preheat the reactants to a high temperature prior to reaction; the ammonia is preheated to a temperature of 320°–540°F., and the concentrated wet-process phosphoric acid is preheated to a temperature of 320°–500°F., preferably 400°–500°F. Part of this heat is economically obtained by heat exchange with the hot reaction melt, and this heat exchange has the added advantage of maintaining the temperature of the reaction mixture at 550°–650°F., which is the preferred reaction temperature. Moreover, this heat exchange with the reactants effectively reduces the "skin" temperature of the interior walls of the reactor thereby significantly reducing corrosion of the reactor equipment.

It has been found that satisfactory heat exchange and the desired reaction temperature of 550°–650°F. are readily obtained if the reactant phosphoric acid concentration is at least 55% $P_2O_5$, preferably 60–70% $P_2O_5$, and the reactants are preheated as described in the previous paragraph. If the phosphoric acid concentration in the feed is less than 55% $P_2O_5$, the required minimum temperature of 550°F. in the reactor will not be reached because of the consumption of relatively large amounts of heat to evaporate excess water in the phosphoric acid. Moreover, if a reaction temperature of at least 550°F. is not achieved in the ammoniation reactor, we have found that transfer of heat through the reactor walls is not practical because the walls are quickly fouled by scale and also because the ammonium polyphosphate melt has a relatively high viscosity and poor heat transfer characteristics. This is attributed to the fact that reaction melts containing 60–90% of the total $P_2O_5$ as polyphosphates are clear, thin melts with good heat transfer properties, whereas melts with lower polyphosphate content are relatively thick slurries which have poor heat transfer properties and form ever increasing scale layers on the heat exchanger surfaces.

DESCRIPTION OF THE PREFERRED EMBODIMENT

In order to demonstrate the invention, the following examples are given:

EXAMPLE 1

Wet-process orthophosphoric acid containing 50.3% $P_2O_5$ is preheated to 265°F. and fed at the rate of 480 tons per day to a conventional stainless steel falling film evaporator to form a concentrated phosphoric acid containing about 60.0% $P_2O_5$. A typical sample of this concentrated wet-process phosphoric acid having the following properties, which will hereinafter be referred to as "Solution A", is found to be useful for purposes of the present invention:

| | |
|---|---|
| Total $P_2O_5$, % | 60.0 |
| Percent of Total $P_2O_5$ as Polyphosphate | 0.0 |
| $Fe_2O_3$, % | 1.8 |
| $Al_2O_3$, % | 1.0 |
| MgO, % | 0.4 |
| CaO, % | 0.1 |
| $SO_4$, % | 2.6 |
| F, % | 0.2 |

Small proportions of sulfate ion are found to be effective as a corrosion inhibitor in the presence of polyphosphate. Accordingly, to minimize corrosion of evaporator tubes, the wet-process orthophosphoric acid is fed into a recycle stream of the concentrated acid. Desirably, the acid contains 2–10% sulfate ion.

Solution A, the above-described concentrated wet-process phosphoric acid, is continuously pumped through a conventional steam heated "Karbate" heat exchanger, operating at 50 psig steam pressure on the shell side, where it is heated to 275°F. The acid is then further preheated to 450°F. by passing it through a conventional spiral heat exchanger which is heated by the hot reaction melt as described hereinafter. The heat exchanger is constructed of "Hastelloy G" which is "Heresite" coated on the acid side.

The anhydrous ammonia to be reacted with the concentrated wet-process phosphoric acid is vaporized and heated to about 380°F. in a conventional steel steam-heated heat exchanger, operating at about 275 psig steam pressure. The ammonia is then further preheated to about 500°F. by passing it through a conventional heat exchanger which is heated by the hot reaction melt as described hereinafter. For convenience, this heat exchanger is called the Melt Reactor; it is a 6-inch diameter "Hastelloy G" reactor tube with a jacket for preheating the ammonia. The Melt Reactor is about 12 feet in height.

The Melt Reactor is arranged in a vertical position, and the preheated ammonia and acid (at 500°F. and 450°F., respectively) are fed tangentially in the bottom. Sufficient ammonia is fed to the Melt Reactor and reacted with the acid to form a partially ammoniated polyphosphate melt containing 9–10% nitrogen and 60–63% $P_2O_5$ within 5 to 15 seconds. The temperature of the reaction mixture rises to about 600°F. and a melt is formed as the mixture passes upwardly through the Melt Reactor. As previously indicated, the feed ammonia is preheated to 500°F. in the jacket portion of the Melt Reactor.

The reaction melt passes from the top of the Melt Reactor to the spiral heat exchanger on the uncoated "Hastelloy G" side of the exchanger. The melt remains fluid as it is cooled from about 600°F. to about 420°F. in the exchanger. It is then discharged through a down-turned end of a horizontal pipe into the middle section of a conventional absorption tower called the Product Absorber. As previously indicated, the feed acid is preheated to 450°F. in the "Heresite" coated portion of the spiral heat exchanger.

The partially ammoniated polyphosphate melt from the spiral heat exchanger at about 420°F. blows downward into the Product Absorber where it is injected into a cooled reservoir of recycling aqueous ammonium polyphosphate together with sufficient ammonia and water to form the product solution containing about 10–13% nitrogen and 33–37% $P_2O_5$, by weight, said solution having about 66% of the total $P_2O_5$ in polyphosphate form. The upper part of the Product Absorber contains conventional polypropylene packing, and the aqueous ammonium polyphosphate is cooled and recycled downward through the Product Absorber. Water vapor and unreacted ammonia discharged into the Product Absorber are absorbed by the circulating aqueous ammonium polyphosphate. Product solution is withdrawn from the Product Absorber in amount equivalent to the reactants fed to the process. The plant typically produces 650 tons per day of 11-37-0 fertilizer solution. This solution is substantially free from precipitated solids and remains stable for at least 90 days.

EXAMPLE 2

The procedure of Example 1 was followed except that the concentrated wet-process phosphoric acid used contained 62 weight percent $P_2O_5$, 4 weight percent sulfuric acid, and no polyphosphate. The acid was fed to the steam heated Karbate heat exchanger and preheated 275°F. It was then passed through the spiral heat exchanger where it was further preheated to 500°F. by heat interchange with the reaction melt. Maximum temperature reached in the Melt Reactor was 650°F. Heat removed from the reaction melt and transferred to the reaction feeds was 3,000,000 B.T.U. per hour. The reaction melt was converted by addition of ammonia to a 10-34-0 fertilizer solution containing 69% of the $P_2O_5$ in the form of polyphosphate.

EXAMPLE 3

The general procedure of Example 1 was followed except that the concentrated wet-process phosphoric acid, after being preheated to 275°F. in the steam heated Karbate heat exchanger, was further preheated through a jacket on the Melt Reactor instead of the external spiral heat exchanger. The ammonia was similarly preheated.

The concentrated wet-process phosphoric acid contained 63.2% by weight $P_2O_5$ and 4% by weight sulfuric acid. In the jacket around the melt tube the acid and the ammonia were heated to about 320°F. while the reaction melt was cooled from the reactor maximum temperature of 600°F. to 360°F. The reaction melt remained thin and clear and the heat transfer surface was not fouled. The heat transfer was satisfactory with 60 square feet of heat transfer surface giving 765,000 B.T.U. per hour of heat transfer. The reaction melt was converted by addition of aqua ammonia to 11-37-0 fertilizer solution containing 64% of the $P_2O_5$ in polyphosphate form.

EXAMPLE 4

(Comparative Example)

The apparatus used in Example 1 was used in this example, but the wet-process phosphoric acid fed to the Melt Reactor contained only 54% by weight $P_2O_5$ and 3% by weight sulfuric acid. This acid was preheated to 275°F. in the steam heated Karbate heat exchanger and further preheated in the spiral heat exchanger. The maximum temperature reached in the Melt Reactor was only 407°F. After 30 minutes operation, the apparatus plugged completely, and it was necessary to shut operations for extensive cleanout operations. When compared with results of Example 1, this example demonstrates that the concentration of the feed acid is a critical element in the present invention.

EXAMPLE 5

(Comparative Example)

The apparatus used in Example 1 was used in this example except that there was no heat exchange of the reaction melt with the inlet feeds. However, the inlet acid and ammonia were preheated to 275°C. in the steam heated heat exchangers. The maximum temperature of the reaction melt in the Melt Reactor was only 420°F. The melt was thick and only 48% of the total $P_2O_5$ was in polyphosphate form. The reaction melt was converted by addition of aqua ammonia to a 10-34-0 fertilizer solution. This solution was not clear and required filtration. After storage of the filtered solution for three months at 75°–85°F., it was found to be badly precipitated. When compaared with results of Example 1, this example demonstrates that heat exchange of the reaction melt with the inlet feeds is a critical element of the present invention.

We claim:

1. In a process for production of ammonium polyphosphate solution which comprises the following steps:
   a. providing a concentrated wet-process phosphoric acid containing 60–70% $P_2O_5$;
   b. continuously reacting said concentrated acid with substantially anhydrous ammonia in an elongated tubular reactor at a temperature of 550°–650°F. for 5–60 seconds, sufficient ammonia being reacted with the acid to produce a reaction melt having a nitrogen to $P_2O_5$ weight ratio between about 0.12 and 0.18, whereby the polyphosphate content of the melt is increased to 60–90% of the total $P_2O_5$ without formation of insoluble reaction products; and
   c. continuously quenching the resulting reaction melt in aqueous ammonia of sufficient concentration to form a clear solution containing 10–13% nitrogen and 33–37% $P_2O_5$ having 60–90% of the total $P_2O_5$ in polyphosphate form, the improvement comprising:
      1. maintaining 2–10% sulfate ion in the concentrated wet-process phosphoric acid of step (a) as a corrosion inhibitor;
      2. preheating the concentrated wet-process phosphoric acid utilized in step (b) in a conventional steam-heated heat exchanger to a temperature of 200°–290°F.;
      3. further preheating said concentrated wet-process phosphoric acid to a temperature of 320°–500°F. by passing said melt from said reactor to an indirect heat exchanger;
      4. preheating the substantially anhydrous ammonia utilized in step (b) in a conventional steam-heated heat exchanger to a temperature of 200°–440°F.;
      5. further preheating said ammonia to a temperature of 320°–540°F. by indirectly heat-exchanging the ammonia with the hot reaction melt in step (b).

* * * * *